No. 719,992. PATENTED FEB. 10, 1903.
J. O. BYRO.
STACK KNIFE.
APPLICATION FILED MAY 26, 1902.
NO MODEL.
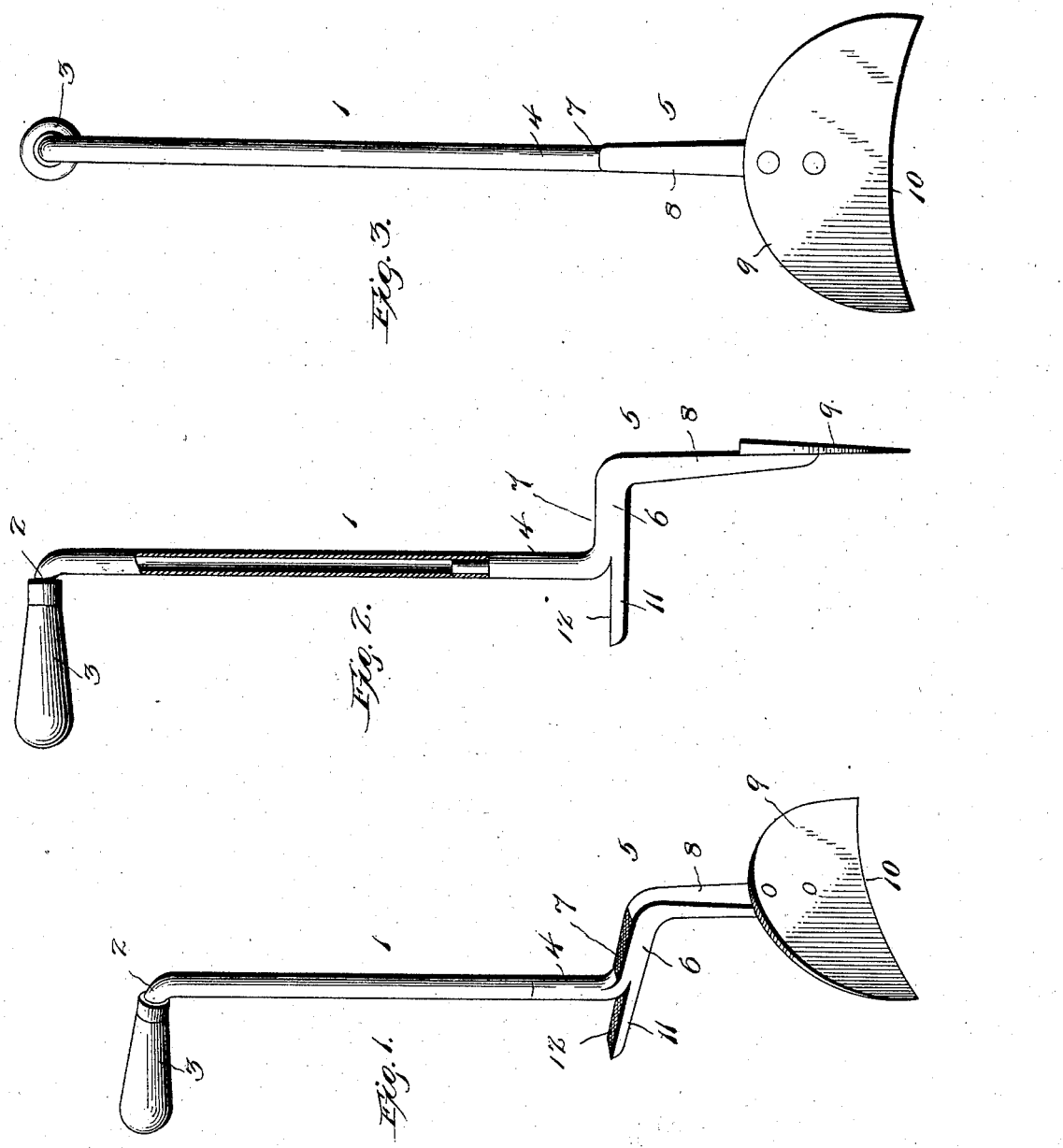
Witnesses
Inventor
Johan Olson Byro,
by
Attorney

UNITED STATES PATENT OFFICE.

JOHAN O. BYRO, OF HANSKA, MINNESOTA.

STACK-KNIFE.

SPECIFICATION forming part of Letters Patent No. 719,992, dated February 10, 1903.

Application filed May 26, 1902. Serial No. 108,960. (No model.)

*To all whom it may concern:*

Be it known that I, JOHAN O. BYRO, a citizen of the United States, residing at Hanska, in the county of Brown and State of Minnesota, have invented certain new and useful Improvements in Stack-Knives, of which the following is a specification.

This invention relates to an improved stack-knife belonging to that type of cutting implements sometimes commonly termed "hay-knives" and which are designed for cutting hay, straw, and other substances in the stack, as well as being used to advantage for cutting up corn in the shock and analogous purposes.

To this end the invention contemplates a simple, practical, and efficient form of stack-knife having the different elements thereof related in such a novel and advantageous way as to provide a construction permitting of a considerable amount of work being accomplished with a minimum effort on the part of the operator. A special object in this connection is to provide for utilizing to the greatest possible extent the pressure of the hand as well as of the foot, at the same time making the implement of a reversible character, whereby either foot or hand may be employed to advantage, according to the preference of the operator or to the conditions of the work.

Also the invention has in view to provide a stack-knife of the character specified which possesses a minimum number of parts and is of simple and practical construction.

With these and many other objects in view, which will more readily appear as the nature of the invention is better understood, the same consists in the novel construction, combination, and arrangement of parts to be hereinafter more fully described, illustrated, and claimed.

The essential features of the invention are necessarily susceptible to some modification from a structural standpoint; but a preferred embodiment of the stack-knife is shown in the accompanying drawings, in which—

Figure 1 is a perspective view of a stack-knife constructed in accordance with the present invention. Figs. 2 and 3 are separate elevations viewing the implement from different sides.

Like reference-numerals designate corresponding parts throughout the figures of the drawings.

In carrying out the invention the implement or cutting-tool may be constructed in any approved manner so long as the essential features of the same are preserved. However, inasmuch as a preferred construction of the implement or tool is shown in the drawings particular reference will be made thereto.

In the drawings the numeral 1 designates the main shank or handle-rod of the tool. This shank or handle-rod may be of solid or tubular form, but in the construction shown is illustrated as consisting of a metal tube of a sufficient length to adapt the tool for being conveniently handled and operated by the operator. The shank or handle-rod, however constructed, is bent at what might be properly termed its "upper" end at right angles to the main portion of the shank or rod to provide the right-angularly-disposed handle-bar 2, upon which is fitted a suitable hand-grip 3, which by reason of the disposition of the handle-bar is likewise disposed at substantial right angles to the main portion of the shank or rod.

The end of the main shank or handle-rod 1 opposite the right-angularly-disposed handgrip 3 is provided with or has suitably united thereto the straight stem portion 4 of a pressure-head 5. This pressure-head constitutes one of the important features of the present invention and preferably consists of a solid metal forging or casting possessing sufficient strength for receiving the pressure of the foot when the knife-blade is thrust into the material to be cut. The straight stem portion 4 of the pressure-head 5 constitutes an extension or part of the main shank or handle-rod 1.

Intermediate its ends the forging or casting constituting the head 5 is provided with a right-angled shoulder portion 6, which is provided on the upper side thereof with a widened and preferably roughened auxiliary foot-rest 7, which is disposed at substantially right angles to the shank or handle-rod and projects over the side thereof opposite the hand-grip 3. Below the right-angled shoulder portion 6 the pressure-head 5 is extended into a substantially straight cutterfoot 8, to the lower end of which is riveted or otherwise rigidly fastened an approximately segmental knife-blade 9. This knife-blade usually consists of a flat plate of steel and is formed with a concave cutting edge 10. This construction provides a very strong knife, which may be readily sharpened and which will keep an even edge.

In connection with the pressure-head 5 another important feature of the invention resides in providing the same with a rigid main rest-arm 11 for the foot. This rest-arm, which constitutes a main rest for the foot, may be integrally formed with the forging or casting forming the pressure-head or welding or otherwise rigidly united thereto. By reason of the extra arm 11 the pressure-head is strongly reinforced at its angled shoulder portion 6, and said arm 11 is preferably broadened and roughened to provide a rest-base 12 for the foot.

It is to be noted particularly that the main foot-rest 11, like the rest 7, is disposed in parallelism to the hand-grip 3; but the said rest 11 is projected beyond the same side of said main shank or handle-rod as the hand-grip 3 and directly beneath and in alinement with the said hand-grip, so that the pressure of the foot may be exerted in direct line with that of the hand. Also under some conditions the foot-rest 7 may be employed and, in fact, the implement reversed and utilized in almost any position, while always providing means whereby the power of the weight of the body may be exerted upon the implement in addition to the pressure employed by the hand or the foot.

From the foregoing it is thought that the construction, uses, and advantages of the herein-described stack-knife will be readily apparent to those familiar with the art, and it will also be understood that changes in the form, proportion, and minor details may be made within the scope of the invention without departing from the spirit or sacrificing any of the advantages thereof.

Having thus described the invention, what is claimed, and desired to be secured by Letters Patent, is—

1. A knife of the class described comprising a shank carrying at one end a hand-grip and at its other end a pressure-head carrying a terminal knife-blade and provided intermediate its ends with a double foot-rest having members projecting respectively beyond opposite sides of the longitudinal plane of the shank.

2. A knife of the class described comprising a shank provided at one end with a right-angularly-disposed hand-grip and at its other end with a pressure-head, said pressure-head carrying at one terminal the knife-blade and having an intermediate angled portion provided with separate foot-rests projecting respectively beyond opposite sides of the longitudinal plane of the shank and both disposed in parallelism to the hand-grip.

In testimony whereof I affix my signature in presence of two witnesses.

JOHAN O. BYRO.

Witnesses:
C. A. HAGBERG,
WILLIAM MEILE.